United States Patent [19]
Majkrzak et al.

[11] Patent Number: 6,074,298
[45] Date of Patent: Jun. 13, 2000

[54] EXTENDED HEIGHT COMBINE HOPPER LEVELING AUGER

[75] Inventors: David S. Majkrzak, West Fargo; Todd A. Nesemeier, Casselton, both of N. Dak.

[73] Assignee: Crary Company, West Fargo, N. Dak.

[21] Appl. No.: 09/099,024

[22] Filed: Jun. 17, 1998

[51] Int. Cl.[7] ............................ A01D 90/10; A01F 12/60
[52] U.S. Cl. ............................................ 460/119; 460/23
[58] Field of Search ............................. 460/23, 119, 114, 460/901, 903; 414/293

[56] References Cited

U.S. PATENT DOCUMENTS

| | | | |
|---|---|---|---|
| 2,848,858 | 8/1958 | Kepkay et al. | 56/10 |
| 3,685,356 | 8/1972 | Zimmerman | 73/290 |
| 3,693,332 | 9/1972 | Bobard | 56/15.6 |
| 4,008,819 | 2/1977 | Hanaway | 214/522 |
| 4,029,228 | 6/1977 | Shaver | 214/522 |
| 4,067,343 | 1/1978 | Mjijs et al. | 130/27 |
| 4,106,649 | 8/1978 | Nelson et al. | 214/522 |
| 4,708,519 | 11/1987 | Davin et al. | 404/101 |
| 4,846,621 | 7/1989 | Warsaw | 414/526 |
| 4,888,940 | 12/1989 | Deutsch | 56/16.6 |
| 4,958,756 | 9/1990 | Conway | 222/164 |
| 5,151,064 | 9/1992 | Damman et al. | 460/23 |
| 5,406,779 | 4/1995 | Deutsch et al. | 460/119 |
| 5,407,390 | 4/1995 | Carney et al. | 460/119 |
| 5,529,537 | 6/1996 | Johnson | 460/6 |
| 5,584,762 | 12/1996 | Buhler et al. | 460/119 |

*Primary Examiner*—Thomas B. Will
*Assistant Examiner*—Meredith Petravick
*Attorney, Agent, or Firm*—Westman, Champlin & Kelly, P.A.

[57] ABSTRACT

A leveling auger for an extendable height combine grain hopper is mounted onto supports pivoted on brackets so that the auger is effective to level grain in the hopper extension space when in a usable position. The auger will move grain into the regions defined by the hopper extensions. The supports can be pivoted to move the leveling auger to a lowered position. When in its lowered position, the auger is below the level of the hopper after the extension walls are folded down for clearance purposes. A separate grain level sensing switch is used for operating the leveling auger so that the leveling auger is run only when grain has reached a preselected height in the grain hopper.

11 Claims, 5 Drawing Sheets

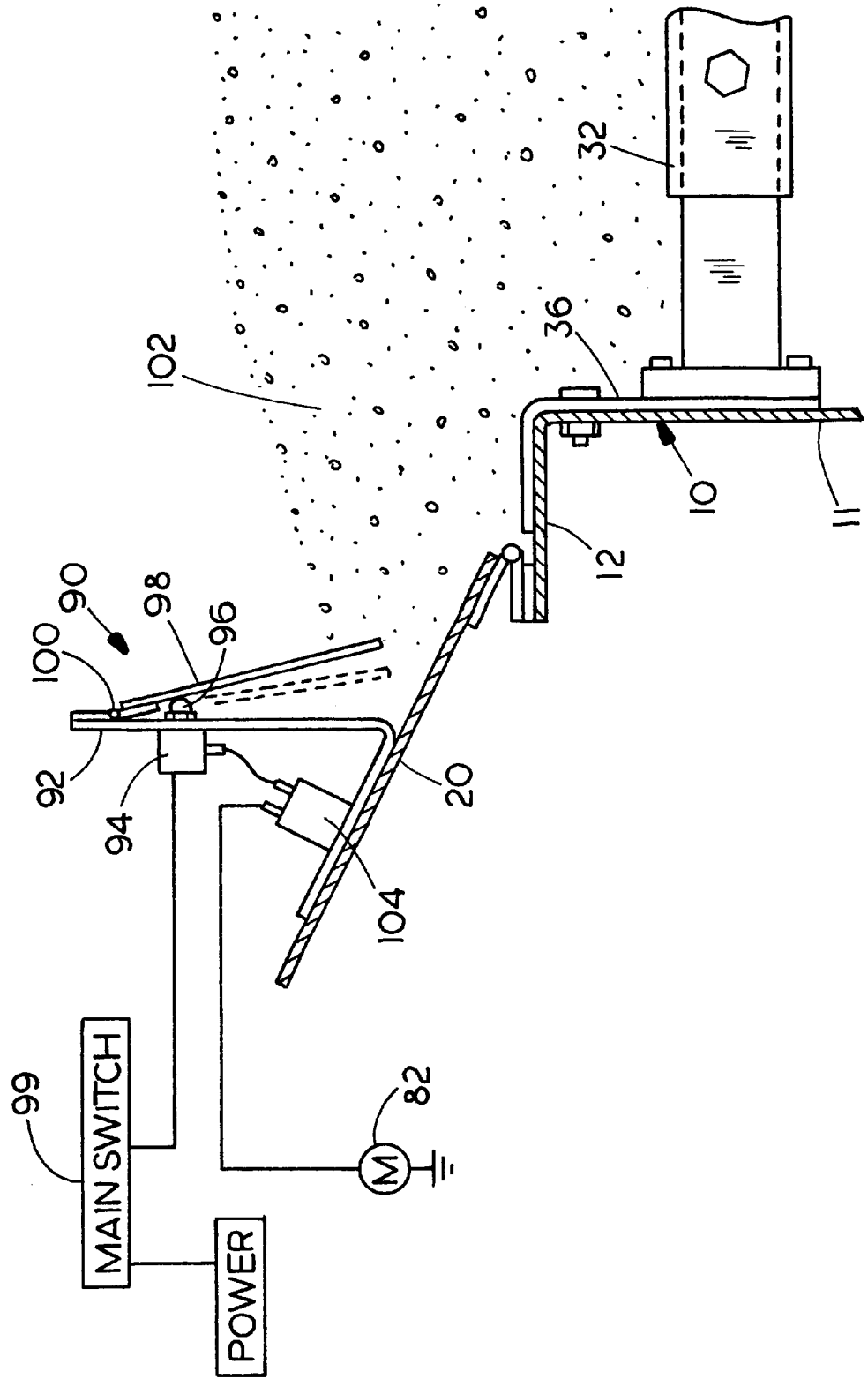

EXTENDED HEIGHT COMBINE HOPPER LEVELING AUGER

BACKGROUND OF THE INVENTION

The present invention relates to a leveling auger for a combine grain hopper that has folding extension walls on the top of the standard hopper side walls. The auger will fold down when needed for clearance, when the extension walls on the hopper are folded down. The auger is operated only at times when the level of grain in the hopper has reached a preselected height.

In the prior art, various augers for filling and moving grain in combine hoppers have been advanced. Combine hopper top fill augers may have sections that extend partially, or all the way across the upper portions of the grain hopper. These augers are fixed in position, and are filling augers. When extension walls are put into place on a hopper, as is now more and more common, the fill augers are not effective to fill grain to the raised height of the hopper and across the hopper.

Also, top cross augers have been utilized at the top of cotton boxes for compacting cotton, and at the same time moving the cotton across the width of the box or hopper.

Grain hoppers that have folding side extension walls for increasing the height and capacity of the production hopper have been used, and one form is shown in U.S. Pat. No. 5,151,064. The extension walls shown in this patent are mounted so that they can be pivoted to be raised and lowered. The lowering of the extension walls is necessary for clearance purposes, since the combines are quite high and are designed to go under existing standard underpasses and through doors for storage sheds that are made so that they will clear standard combine grain hoppers. When the extension walls are in place they have to be folded to provide the original lower profile for transport and storage. With the extensions raised, there may not be enough clearance. Thus, having a leveling auger fixed in position at the level of the top of the side wall extensions is not satisfactory.

SUMMARY OF THE INVENTION

The present invention relates to a leveling auger for mounting onto the side walls of a combine grain hopper, and when operating positioned at a level such that it will level grain being introduced into the hopper to aid in filling a grain hopper that has side wall extensions. The side wall extensions are foldable to substantially the level of a base hopper, for clearance purposes. The auger is mounted so it also is foldable to position the leveling auger of the present invention within the space of the standard grain hopper or tank, that is, below the plane of the top edges of the basic hopper, when desired for transport or storage.

In order to insure that the drive motor for the leveling auger is not operated unnecessarily, a switch plate is used in the hopper to sense when the grain reaches a selected level, after which the leveling auger is driven. The switch thus controls the motor that drives the leveling auger of the present invention.

The mounting frame for the auger is simple and adaptable for ease of mounting, and can be adjusted for different widths of grain hoppers or tanks. The frame members are supported on the edges of the basic hopper or can be bolted in place so they are easily adapted to different hoppers. The height of the leveling auger from its supporting frame members can be modified by using supports of different length. The leveling auger will move the grain being introduced to the hopper to sides of the hopper so that it does not form high piles and so that the major part of the increased volume of storage provided by the extension walls is utilized.

BRIEF DESCRIPTION OF THE DRAWINGS

FIG. 6 is a sectional view of a side of a hopper extension showing a control switch for starting the leveling auger motor made according to the present invention.

DETAILED DESCRIPTION OF THE PREFERRED EMBODIMENTS

A combine grain hopper illustrated generally at 10 has a main or standard hopper 11 that has upright side walls that terminate on a peripheral edge flanges 12. The hoppers 10 are generally used on combines that have a fill auger that can be of the "bubble up" type shown generally at 14 in the center of the basic or standard grain hopper 11. The fill auger 14 receives grain from a grain pan after threshing and separating.

Figure 1:
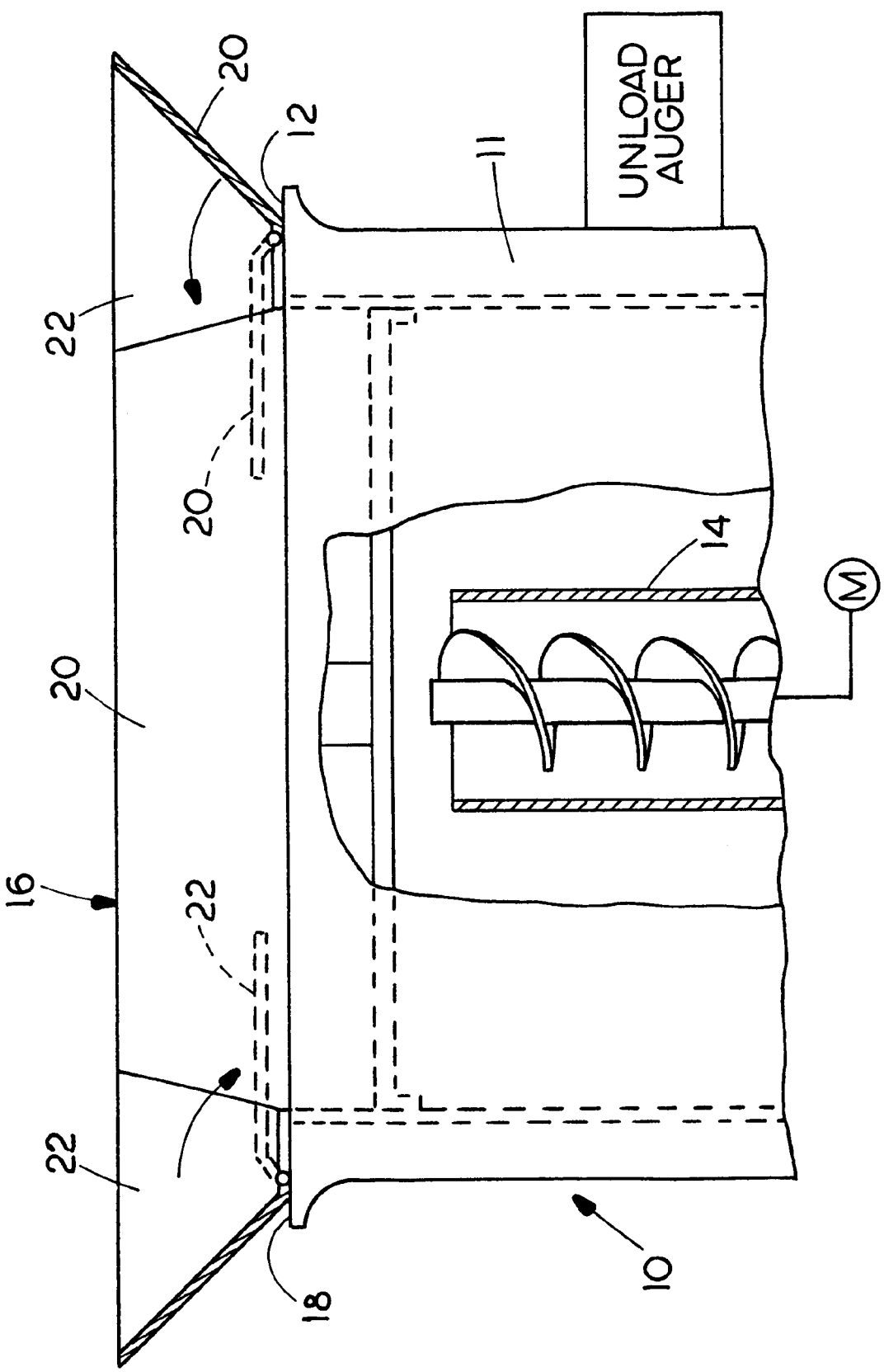
FIG. 1 is a side view of a typical combine hopper having side extensions thereon, in their raised position, and having an auger made according to the present invention installed thereon.
Figure 2:
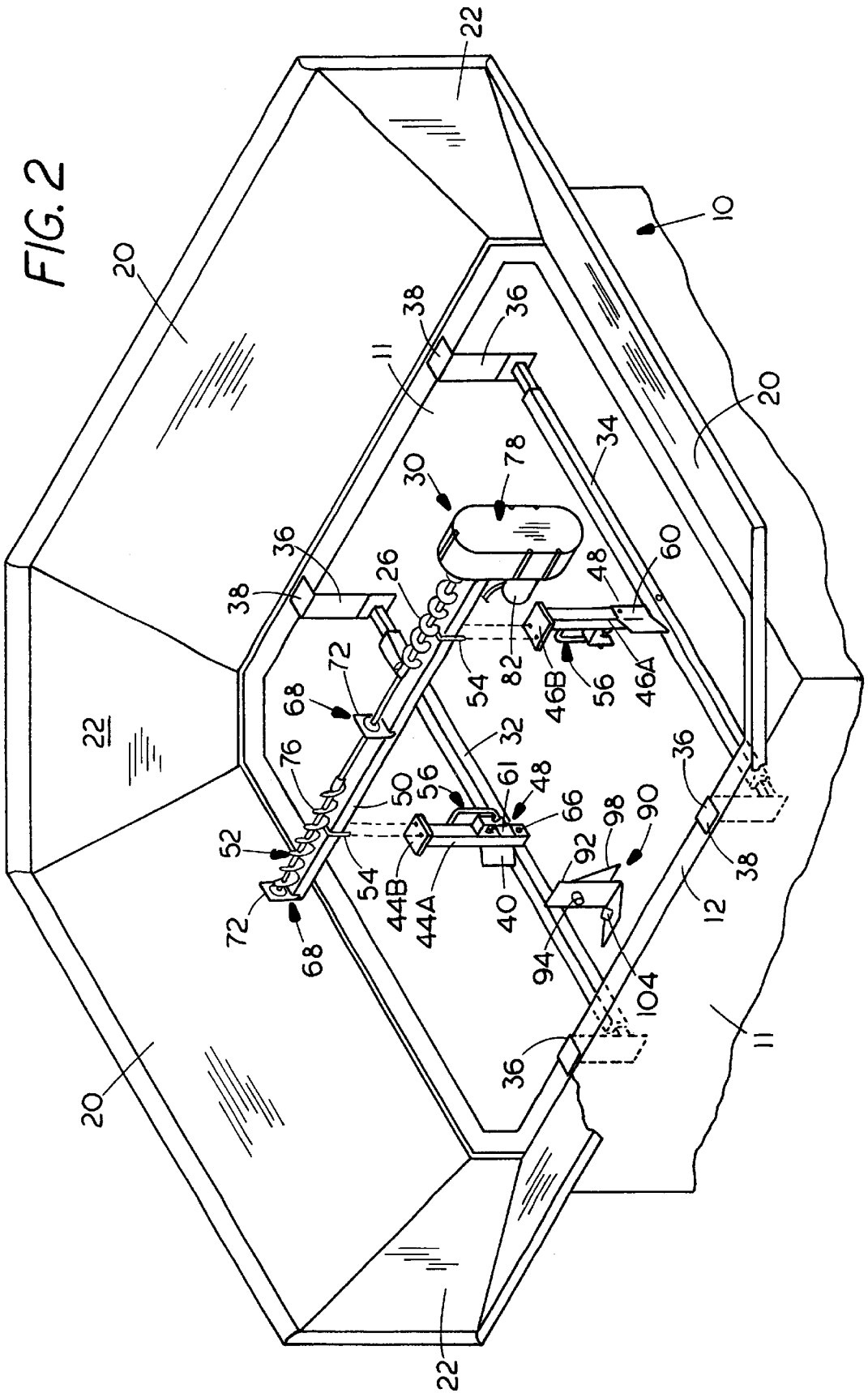
FIG. 2 is an exploded perspective view of a grain hopper showing the mounting for the auger of the present invention.
Figure 3:
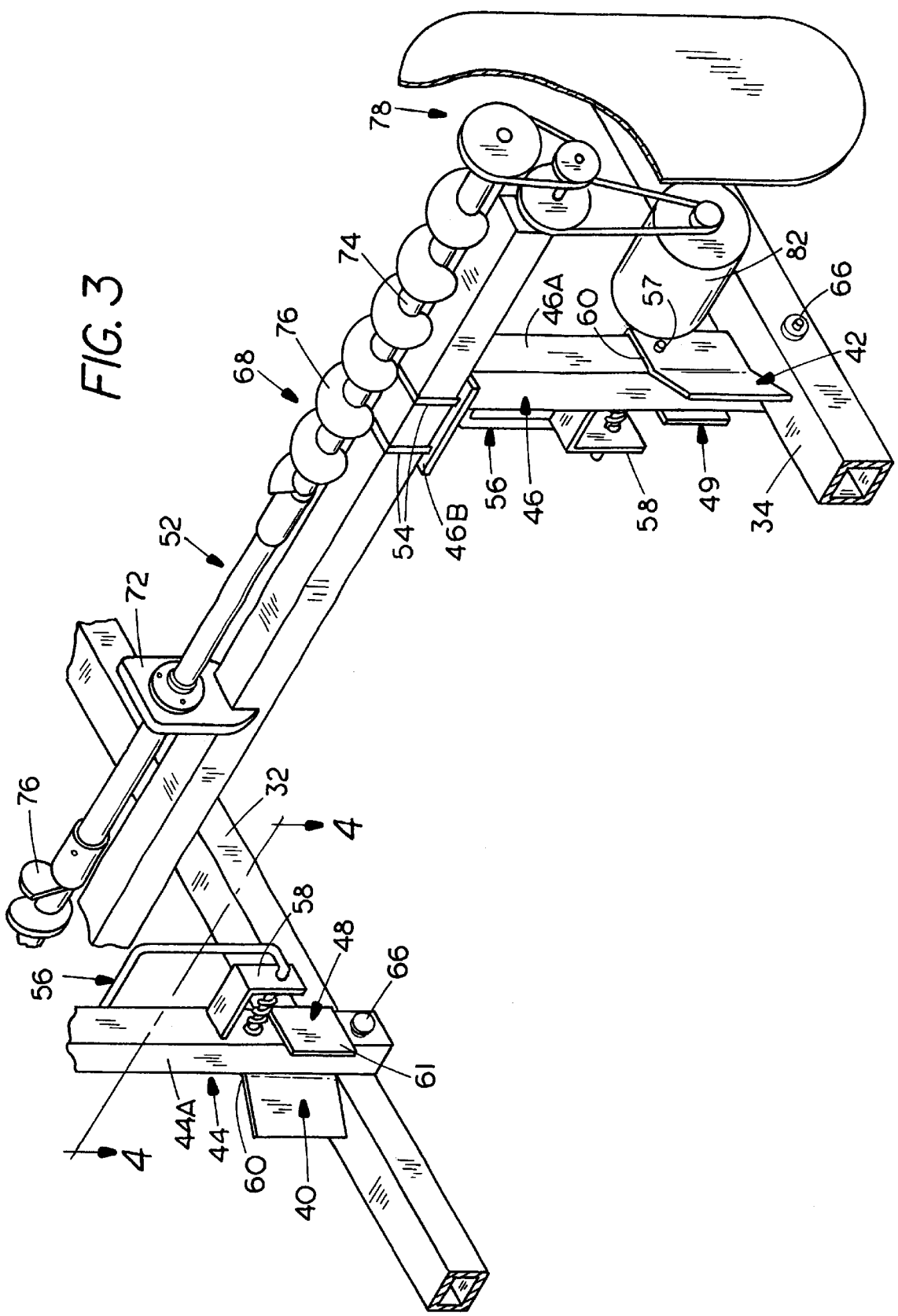
FIG. 3 is a further enlarged view of a typical auger used in the present invention.
Figure 4:
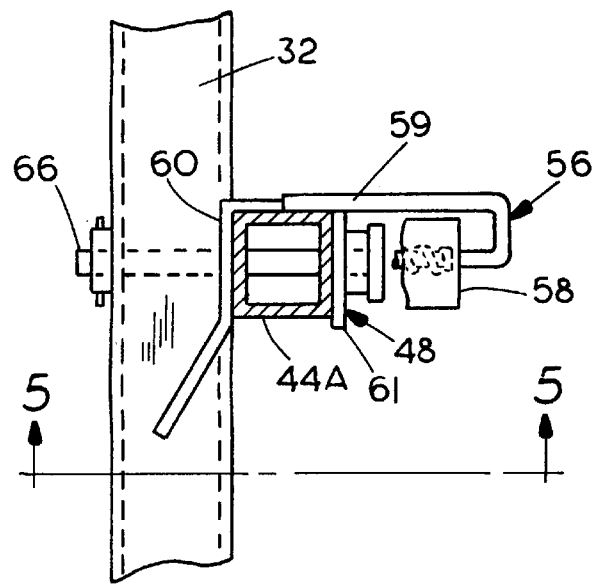
FIG. 4 is a sectional view taken as on line 4—4 in FIG. 3.

It is now becoming much more frequent to include side extension walls illustrated generally at 16 on combine hoppers to increase hopper capacity. The extension walls are pivotally mounted with suitable hinges 18 to the top edges of flanges 12 of the basic grain hopper 11 of the combine. As shown schematically in FIG. 2, the extensions 16 are planar wall panels 20 for the front, rear and lateral sides. The wall panels 20 are joined with corner sections 22 that are releasably mounted relative to the side and end wall panels 20. The side and end wall panels 20 are hinged and can be folded inwardly to overlie the open space of the conventional hopper, and then the corner sections can be folded over the side wall extensions, to return the basic hopper to substantially its standard height as shown in dotted lines in FIG. 1. This type of extension walls for a grain hopper is sold by the assignee of the present invention, Crary Company, of West Fargo, N. Dak. under the trademark BIG TOP. The side extension walls generally taper laterally out from the standard combine grain hopper, and in some cases have vertical wall sections at the upper edge. The increased capacity of the hopper is needed to reduce stops for unloading and to insure there is no need for midfield unloading.

The conventional hopper fill augers such as that shown schematically at 14 do not have sufficient lift or power to fill the hopper when extensions are added, and other augers designed for standard hoppers will not distribute the grain to the outer side and corners of the extension space. A leveling auger assembly 30 made according to the present invention is used for insuring that the volume encompassed by the side extension walls will be adequately filled and the grain will be satisfactorily distributed around the side extensions.

The auger of the present invention is an add-on auger that is designed to be attached to existing combine grain hoppers, and includes a pair of telescoping, horizontal or lateral frame support members 32 and 34, which are supported onto mounting plates 36 on opposite ends. The mounting plates 36 can be bolted directly to side walls 11 of the existing combine hopper. The mounting plates have flanges 38 as shown which rest on top edge flanges 12 of the side walls 11 for further support. The frame members 32 and 34 are secured in place parallel and spaced a desired distance apart. The frame members 32 and 34 are positioned below the plane of the top edges of the main grain hopper, to provide proper positioning when the leveling auger is folded down. Each of the frame members 32 and 34 has a pivot tube support 40 and 42, respectively, welded thereon. Pivot tube supports 40 and 42 form saddles 48 and 49 having side walls for receiving pivot tube assemblies 44 and 46. The pivot tube assemblies can be moved to and from an upright position held in saddles 48 and 49 on the respective pivot tube supports 40 and 42, with the pivoting upright support members or tubes 44A and 46A extending vertically. The saddles are each formed by a base wall 59 and spaced side walls 60 and 61 fixed to the base wall.

Figure 5:
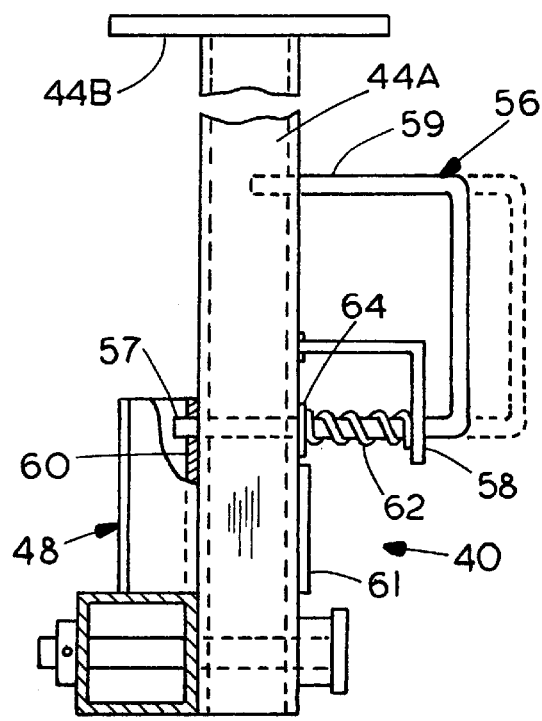
FIG. 5 is a sectional view taken as on line 5—5 in FIG. 4.

The upright support members 44A and 46A of the pivot tube assemblies 44 and 46 have mounting plates 44B and 46B at the upper ends thereof. Plates 44B and 46B support an auger frame tube 50 of a leveling auger assembly 52 using suitable U-bolts 54 that clamp down onto the plates 44B and 46B. The pivot tube assemblies 44 and 46 will engage the base wall 59 of the respective saddle 48 and 49 so they are stopped in an upright position. The pivot tube assemblies are held in position with a spring loaded lock pin 56, carried on each of the upright support members 44A and 46A. The lock pin is U-shaped and has a leg forming a pin end 57 as shown in FIG. 5 that passes through an aperture in a bracket wall 58 mounted on the respective upright support member or tube, and also will pass through apertures in the respective upright support member or tube 44A or 46A and through an aperture in the upright side wall 60 of the respective saddle 48 or 49. The pin end 57 is spring loaded to its latched position extending through the aperture in the respective wall 60 by a compression spring 62 that mounts around the pin end, and bears against the bracket wall 58 and a cross roll pin 64 in the pin end 57 on the inner side, so that the compression spring 62 will tend to urge the pin end 57 in a direction to engage the wall 60. The leg 59 of the U-shaped latch is of length so it can be moved to abut the respective upright support member 44A or 46A when the latch is released to hold the pin out of the aperture in wall 60. When latched, the leg 59 passes along the side of the respective upright support.

When the grain hopper extension walls 22 and 20 are to be folded inwardly for storage of the combine or transport, the pin handles 56 can be pulled out against the loading of the compression springs 62 so that the pin ends clear the walls 60. The pins can be locked out of the holes in walls 60 by swinging the top leg 59 so its end engages the outer side of the respective pivot tube 44A and 46A. Both of the pivot tubes 44A and 46A can be folded down about their pivot bolts or pins 66. The pins 66 pass through the frame members 32 and 34, respectively, and the pivot tubes 44A and 44B. The pivot pins 66 are made to support the weight necessary.

When the pivot tube assemblies 44 and 46 are pivoted down about their pins 66, the auger assembly 52 is below the level of the upper edge of the standard grain hopper with which it is used and is out of the way. The leveling auger does not increase the clearance needed for the combine for transport.

The auger assembly 52 has a conventional helical screw auger 68, that is supported by the main support frame 50. The frame 50 has bearing support plates 72 mounted thereon, for supporting a screw auger shaft 74 that has helical screw sections 76 that can be used for moving material from the center (where grain is delivered to the hopper) out toward the hopper edges. The shaft 74 is driven through a suitable chain and sprocket drive assembly 78 that is supported on a base plate 80 welded to the frame member 52. The base plate 80 also mounts an electric motor 82 that drives a drive sprocket for the sprocket and chain assembly 78. A speed changing arrangement can be used to obtain the necessary speed of operation of the auger 68.

The electric motor 82 is controlled (on and off) through a level sensing switch assembly 90 (see FIG. 6) which includes a support leg 92 that is bolted onto one of the inclined extension frame members 20 at a suitable level on the hopper. It is positioned so it senses the correct grain height for operation, and also so it will not be in the way for folding the extension walls. The support leg 92 extends generally vertically upwardly, and mounts a switch 94 that has a spring loaded plunger 96 that extends through the leg 92. A light weight actuator plate 98 is hingedly mounted as at 100 to the support leg 92, and the plate 98 rests down over the plunger 96. When grain indicated generally at 102 starts filling the hopper, it will rest on the outside of the actuator plate 98, and will cause the actuator plate 98 to pivot inwardly to move the plunger 96 inwardly. This in turn will turn on the switch 94 to provide power to a solenoid 104 that will connect power to the motor 82. The motor 82 will keep running as long as the grain is in contact with the actuator plate 98 and a main on/off switch 99 intermediate the switch 94 and the motor is on. The motor 82 can be turned off manually or with a separate "hopper full" sensor when grain contacting the actuator plate 98. The motor 82 will not have to be run continuously since it will be started when the standard grain hopper gets full.

The frame supports or cross members 32 and 34 can be mounted on any suitable combine hopper or grain tank with the support frame below the top level of the main or standard grain hopper, so when the auger assembly 52 folds, it will be no higher than the height of the standard grain hopper for insuring that the auger will not protrude up and strike objects that have low clearance. The particular extension wall configuration and the manner of folding is not material to the invention since the folding auger will adapt to substantially any extension wall arrangement.

Although the present invention has been described with reference to preferred embodiments, workers skilled in the art will recognize that changes may be made in form and detail without departing from the spirit and scope of the invention.

What is claimed is:

1. A leveling auger for a grain hopper on a harvesting machine the grain hopper comprising a base hopper having upper edges and extension walls hingedly mounted on the grain hopper and extending upwardly above the upper edges, the extension walls being foldable downwardly to reduce the height of the extension walls, the leveling auger comprising a laterally extending frame having supports for attachment to walls of a grain hopper, a pivot bracket on the frame including an upright support pivotally mounted for movement between a raised position wherein the upright support is upright, and a lowered position which would position the auger below the upper edges of the grain hopper, and an auger assembly mounted on an upper end of the upright support and extending at least partially across said grain hopper.

2. The apparatus of claim 1, wherein said frame comprises a pair of laterally extending frame members having ends supported on the grain hopper, each frame member carrying a separate pivot bracket and a separate upright support.

3. The apparatus of claim 2, wherein said pivot brackets include saddles for supporting the upright supports in an upright position, and a latch carried on pivot brackets for engaging the respective upright support and holding the upright support in its raised position.

4. The apparatus of claim 2, wherein said upright supports have support plates at their upper ends, said support plates of the upright supports on the frame members being substantially on a plane when in the raised position.

5. The apparatus of claim 1, wherein said auger assembly includes an electric drive motor operably coupled to drive the auger, and a grain level sensing switch having a bracket for mounting the switch on a portion of a grain hopper to sense when grain in the grain hopper is at a known level.

6. The apparatus of claim 5, wherein said bracket for said grain level sensing switch has an upright leg, the sensing switch being a spring loaded on/off switch mounted on said upright leg including a plunger, a sensing plate pivotally mounted on said upright bracket about an axis above said plunger of said on/off switch, and having a portion engaging said plunger, whereby weight caused by grain on the sensing plate results in movement of the sensing plate to actuate the switch.

7. A grain leveling assembly for use with a combine having a fixed height grain hopper with foldable extension walls mounted on upper edges of the fixed height grain hopper, comprising a frame extending across a lateral dimension of the grain hopper, said frame having brackets for mounting onto the fixed height grain hopper with the frame having an auger support region a distance below the upper edges of the fixed height grain hopper, said frame having a pair of pivot brackets mounted thereon in the auger support region, each of said pivot brackets including a pivot pin supported to provide an axis of pivoting, a pair of upright supports, one mounted on each of said pivot pins of the pivot brackets and movable between an upright position and a generally lowered position, and a powered grain auger mounted on ends of the upright supports opposite from the pivot pins, said frame being positioned sufficiently below the upper edges of said base fixed height grain hopper so the powered grain auger is below a plane defined by the upper edges of the fixed height hopper when the upright supports are in their lowered position.

8. The leveling auger assembly of claim 7, wherein said frame comprises a pair of elongated frame members that are spaced apart in direction perpendicular to the lateral dimension, each frame member supporting one pivot bracket.

9. The leveling auger assembly of claim 8, wherein the pivot brackets include a saddle in which each of the upright supports seats when the supports are upright, each saddle including side walls that are spaced apart to receive the associated upright support between them, and a base wall of the saddle joining the side walls and forming a stop against with the respective upright support will rest to limit pivoting in one direction.

10. The leveling auger assembly of claim 9 and a separate latch pin carried by each upright support and engageable with an aperture in the respective saddle to releasably latch the upright supports in an upright position.

11. The leveling auger assembly of claim 8, wherein said elongated frame members each comprise a pair of telescoping tubes to permit length adjustment of the elongated frame members.

\* \* \* \* \*